United States Patent [19]
Maeda

[11] Patent Number: 5,693,920
[45] Date of Patent: Dec. 2, 1997

[54] TWO-STAGE MOVEMENT SEESAW SWITCH APPARATUS

[75] Inventor: Takuya Maeda, Miyagi-ken, Japan

[73] Assignee: Alps Electric Co., Ltd., Tokyo, Japan

[21] Appl. No.: 539,917

[22] Filed: Oct. 6, 1995

[30] Foreign Application Priority Data

Oct. 7, 1994 [JP] Japan .................................. 6-244227

[51] Int. Cl.$^6$ .............................. H01H 9/00; H01H 23/28
[52] U.S. Cl. ...................... 200/1 B; 200/5 A; 200/339
[58] Field of Search .................... 200/1 R, 1 B, 200/5 R, 5 A, 512–517, 308–317, 339

[56] References Cited

U.S. PATENT DOCUMENTS

| | | | |
|---|---|---|---|
| 4,710,602 | 12/1987 | Baity et al. | 200/5 A X |
| 5,426,275 | 6/1995 | Maeda et al. | 200/5 R X |
| 5,430,261 | 7/1995 | Malone | 200/1 B |

OTHER PUBLICATIONS

Japanese U.M. Laid–open No. Sho 58–131537, Double–Stage Seesaw Switch.
Japanese U.M. Publication No. Hei 2–988, Switch Device.

Primary Examiner—J. R. Scott
Attorney, Agent, or Firm—Guy W. Shoup; Patrick T. Bever

[57] ABSTRACT

A two-stage movement seesaw switch apparatus of the light irradiation type which is compact and superior in operation feeling. The two-stage movement seesaw switch includes a pair of operation plates disposed immediately below a manually operable knob. Two sets of push switches, each set including two push switches, are disposed such that a straight line interconnecting the push switches of each set extends obliquely with respect to a center axis of pivotal motion of the manually operable knob. The push switches are actuated by contact with the operation plates when the manually actuated knob is pivoted. Each of the operation plates has an opening formed therein for passing light emitted from an LED therethrough and has a pair of projections formed thereon next to the opening.

14 Claims, 6 Drawing Sheets

TWO-STAGE MOVEMENT SEESAW SWITCH APPARATUS

BACKGROUND OF THE INVENTION

1. Field of the Invention

This invention relates to a two-stage movement seesaw switch apparatus for use with an apparatus for opening or closing a window of an automobile or the like, which first- and second-stage electric signals in response to the tilting angle of the manually operable knob.

2. Description of the Related Art

A two-stage movement seesaw switch apparatus has been proposed by the assignee of the present application and is disclosed, for example, in Japanese Utility Model Laid-Open No. Sho 58-131537. The disclosed switch apparatus outputs first- and second-stage electric signals in response to the tilting angle of the manually operable knob.

Figure 6:
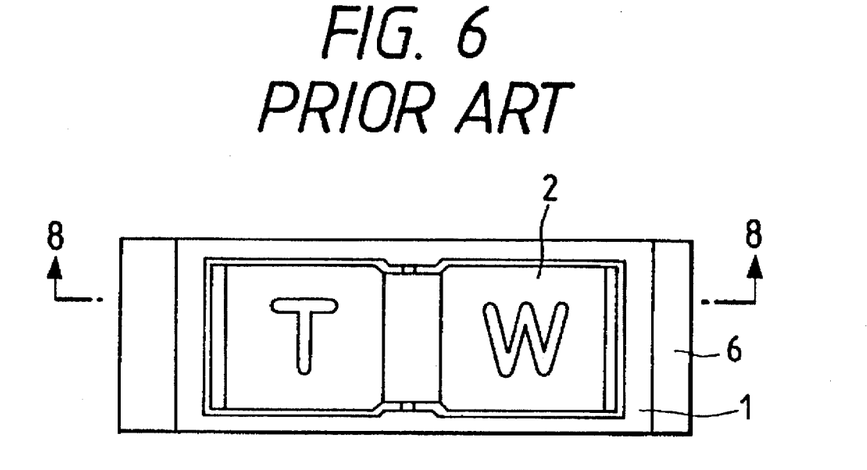
FIG. 6 is plan view of a conventional two-stage movement seesaw switch apparatus.
Figure 7:
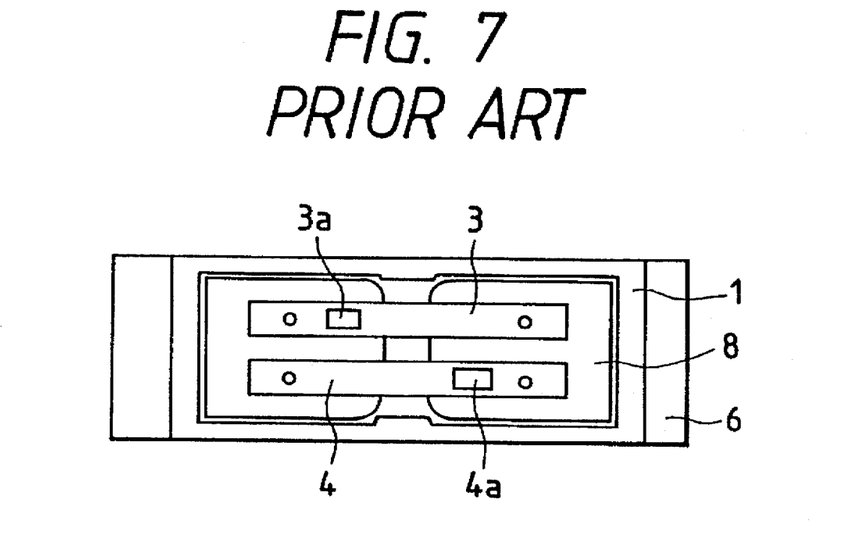
FIG. 7 is a plan view showing the two-stage movement seesaw switch apparatus of FIG. 6 with a manually operable knob removed.

FIG. 6 is a plan view of a two-stage movement seesaw switch apparatus of the type mentioned above; FIG. 7 is a plan view of the two-stage movement seesaw switch of FIG. 6 with a manually operable knob removed; and FIGS. 8A to 8C are sectional views taken along line A–A' of FIG. 6 and illustrate movement of the two-stage movement seesaw switch apparatus of FIG. 6.

Referring to FIGS. 6 to 8C, the conventional two-stage movement seesaw switch apparatus includes a manually operable knob 2 supported for rocking motion on a casing 1, a pair of operation plates 3 and 4 disposed in a juxtaposed relationship in the inside of the casing 1 for being pressed by the manually operable knob 2, a base plate 6 having a pair of fixed contacts 5a and 5b thereon, and a click rubber member 8 in the form of a sheet disposed between the base plate 6 and the operation plates 3 and 4 and having a plurality of hollow projections 8a and 8b. A pair of movable contacts 7a and 7b are provided in an opposing relationship to the fixed contacts 5a and 5b in the hollow projections 8a and 8b, respectively. A damping member 3a is mounted on a surface of the operation plate 3 on the left side of the center of pivotal motion of the manually operable knob 2 such that, when the manually operable knob 2 is tilted leftwardly (counterclockwise), a projection 2a provided on the bottom side of the manually operable knob 2 presses the operation plate 3 by way of the damping member 3a. Meanwhile, a damping member 4a is mounted on a surface of the other operation plate 4 on the right side of the center of pivotal motion of the manually operable knob 2 such that another projection not shown provided on the bottom side of the manually operable knob 2 presses the operation plate 4 by way of the damping member 4a. It is to be noted that the fixed contact 5a and the movable contact 7a cooperate with each other to form a push switch which is operated by the operation plate 3, and simultaneously, the fixed contact 5b and the movable contact 7b cooperate with each other to form another push switch which is operated by the operation plate 3. Similarly, another set of push switches (not shown) are provided for the other operation plate 4.

Figure 8A:
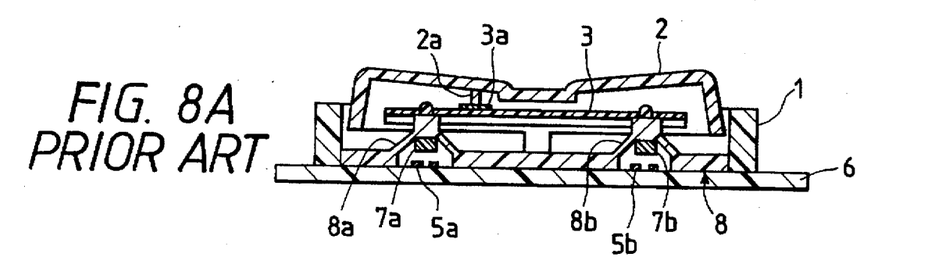
FIGS. 8A to 8C are schematic sectional views illustrating movement of the two-stage movement seesaw switch apparatus of FIG. 6.
Figure 8B:
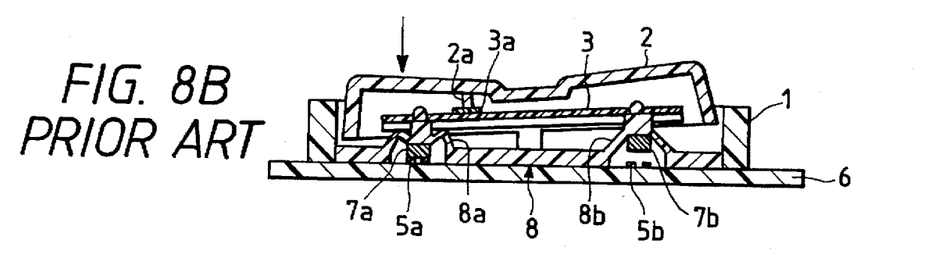
Figure 8C:
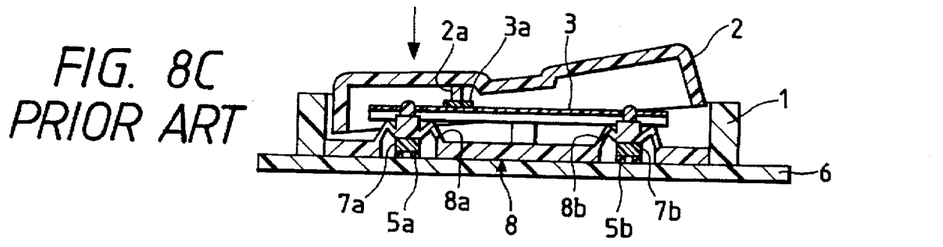

In the present two-stage movement seesaw switch apparatus, if, when it is in an inoperative condition shown in FIG. 8A, the manually operable knob 2 is tilted to the left side (counterclockwise) in FIG. 8A against the resilient force of the click rubber member 8, then the operation plate 3 is pressed by way of the damping member 3a located in the tilting direction, whereupon the operation plate 3 is first pivoted in the tilting direction around the hollow projection 8b which is comparatively remote from the acting point of the pressing force. Thereupon, the hollow projection 8a of the click rubber member 8 positioned in the tilting direction is pressed by the operation plate 3, and consequently, the hollow projection 8a is yieldably deformed as shown in FIG. 8B to provide a click feeling. Further, since the movable contact 7a provided on the hollow projection 8a is thereafter brought into contact with the fixed contact 5 opposing thereto, a first-stage electric signal is output in accordance with the tilting direction of the manually operable knob 2. If the manually operable knob 2 is further pushed to the left side in FIG. 8B, the operation plate 3 is pivoted in the direction opposite to the initial tilting direction around the hollow projection 8a, whereupon the other hollow projection 8b is pressed by the operation plate 3. Consequently, the hollow projection 8b is yieldably deformed as shown in FIG. 8C to produce a second click feeling. Further, since the movable contact 7b provided on the hollow projection 8b is thereafter brought into contact with the fixed contact 5b opposing thereto, a second-stage electric signal is outputted in accordance with the tilting direction and tilting angle of the manually operable knob 2. Then, if the tilting force applied to the manually operable knob 2 is cancelled, then the manually operable knob 2 is returned to its neutral position by way of the operation plate 3 by the resilient forces of the hollow projections 8a and 8b of the click rubber member 8, while the hollow projections 8a and 8b return to their individual non-operated conditions by their own resilient forces. Consequently, the movable contacts 7a and 7b are spaced away from the fixed contacts 5a and 5b and return to their initial off conditions, respectively.

On the other hand, if, when the two-stage movement seesaw switch apparatus is in the inoperative condition shown in FIG. 8A, the manually operable knob 2 is tilted to the right side (clockwise) in FIG. 8A, then since the other operation plate 4 is pressed by the manually operable knob 2 by way of the damping member 4a, first- and second-stage electric signals are outputted in response to a tilting angle from the set of push switches corresponding to the operation plate 4 similar to the case described above wherein the operation plate 3 is pressed.

In the two-stage movement seesaw switch apparatus having the construction described above, since the operation plates 3 and 4 are disposed in parallel to each other along the tilting direction of the manually operable knob 2, when the two-stage movement seesaw switch apparatus shown in FIGS. 6 to 8C is compared with such a switch apparatus wherein a pair of operation plates are disposed on a straight line along the tilting direction of a manually operable knob as disclosed in, for example, Japanese Utility Model Publication No. Hei 2-988, the switch apparatus shown in FIGS. 6 to 8C has a reduced overall length and can be made smaller than the switch apparatus shown in Japanese Utility Model Publication No. Hei 2-988.

With the aforementioned two-stage movement seesaw switch apparatus disclosed in Japanese Utility Model Laid-Open No. 58-131537, since a straight line interconnecting the two push switches which are pressed by the operation plate 3 is offset from the center line of the longitudinal direction of the manually operable knob 2, and also another straight line interconnecting the two push switches which are pressed by the other operation plate 4 is offset similarly, when the manually operable knob 2 is pushed by manual operation, the manually operable knob 2 is acted upon not only by a reactive force acting in the pivoting direction (longitudinal direction of the manually operable knob 2) but also by a reactive force acting in a direction (lateral direction of the manually operable knob 2) perpendicular to the pivoting direction. Consequently, the two-stage movement seesaw switch apparatus is disadvantageous in that the operation feeling of the operator is deteriorated by the reactive forces.

SUMMARY OF THE INVENTION

It is an object of the present invention to provide a two-stage movement seesaw switch apparatus which is compact and is superior in operation feeling.

It is another object of the present invention to provide a two-stage movement seesaw switch apparatus of the light irradiation type which is compact and is superior in operation feeling.

In order to attain the objects described above, according to the present invention, there is provided a two-stage movement seesaw switch apparatus constructed such that it comprises a manually operable knob supported for rocking motion around a support shaft, a pair of operation plates individually tilted by a pressing force from the manually operable knob, and two sets of push switches, each set including two push switches and individually disposed below the operation plates for being individually operated by the operation plates in response to tilting angles of the operation plates, wherein a straight line interconnecting the push switches of each of the sets intersects obliquely with an axial line of the support shaft.

In the two-stage movement seesaw switch apparatus, since the two sets of push switches, each including two push switches which are operated by a single operation plate, are disposed such that the straight line interconnecting the push switches of each set intersects obliquely with the axial line of the support shaft, while the distances required between the push switches in each set is maintained, the dimension of the arrangement of the two operation plates in the longitudinal direction of the manually operable knob can be made comparatively short. Further, since the pair of operation plates can be disposed just below the longitudinal direction passing the center of the manually operable knob, when the manually operable knob is manually depressed, the pressing force from the manually operable knob is transmitted uniformly to the operation plates. Furthermore, since the two push switches are disposed on the opposite sides of the center line of the longitudinal direction of the manually operable knob, the reactive force acting upon the manually operable knob is uniform, and as a result, a good operation feeling is obtained.

Preferably, the two-stage movement seesaw switch apparatus is constructed such that each of the operation plates has an opening formed therein for passing light emitted from a light emitting element therethrough, and has, on the opposite sides thereof along the axial direction of the support shaft across the opening, a pair of actuating portions for transmitting the pressing force from the manually operable knob to the operation plate.

Since the push switches are disposed in the above-decribed specific arrangement, also the width dimension of the operation plates can be made comparatively large. Consequently, the opening for irradiation light can be provided readily at a central portion of each of the operation plates. Further, since each of the radiation plates has, on opposite sides thereof along the axial direction of the support shaft across the opening, actuating portions for transmitting the pressing force from the manually operable knob to the operation plate, light emitted from the light emitting elements passes through the openings without being disturbed by the actuating portions and is irradiated upon the light irradiation portions on the opposite sides of the manually operable knob. Accordingly, a two-stage movement seesaw switch apparatus of the light irradiation type which is compact and superior in operation feeling is obtained.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Referring to FIGS. 1 to 5C, there is shown a two-stage movement seesaw switch apparatus according to a preferred embodiment of the present invention. The two-stage movement seesaw switch apparatus is employed as a part of a power window unit of an automobile (shown in FIG. 3) and includes: as principal components thereof, a casing 12 serving as an outer shell and having a pair of openings 11 and a pair of perforations 11a and 11b; a pair of manually operable knobs 13 and 14 of the seesaw type supported for rocking movement around support shafts 12a (shown in FIG. 4) of the casing 12 and partially exposed to the outside through the openings 11; a first operation plate 15a and a second operation plate 15b for being pressed by the manually operable knob 13; a third operation plate 15c and a fourth operation plate 15d for being pressed by the other manually operable knob 14; a base plate 19 mounted on a cover (not shown) and having thereon a plurality of sets of fixed contacts 17, a plurality of LEDs 18 serving as light emitting elements; and a click rubber member 22 in the form of a sheet disposed between the base plate 19 and the operation plates 15a to 15d and having a plurality of hollow projections 20 individually positioned on the fixed contacts 17 and a plurality of reduced thickness projections 21 for accommodating the LEDs 18 therein and transmitting light from the LEDs 18 therethrough.

Figure 3:
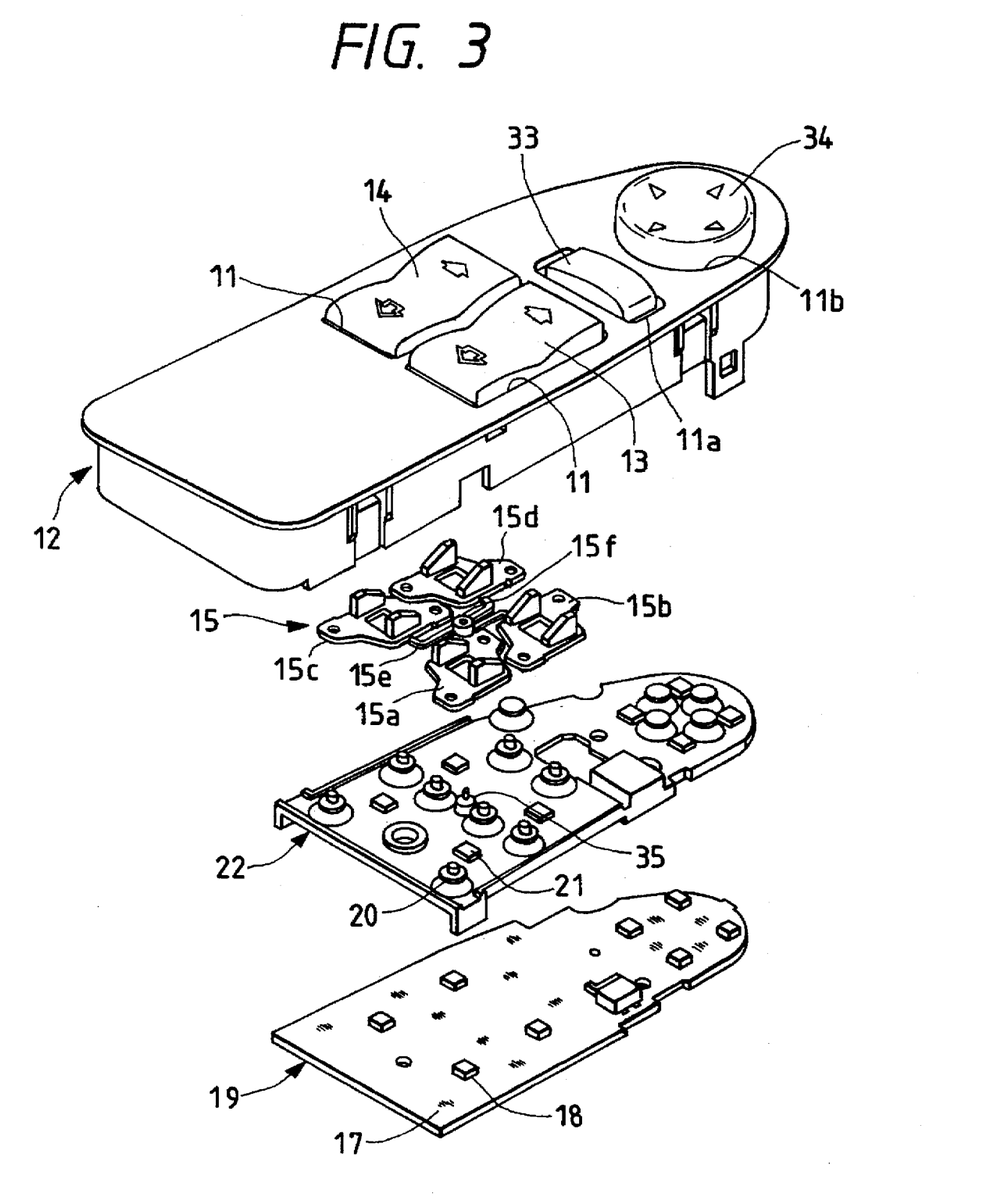
FIG. 3 is an exploded perspective view of a power window unit of an automobile in which the two-stage movement seesaw switch apparatus of FIG. 1 is incorporated.
Figure 4:
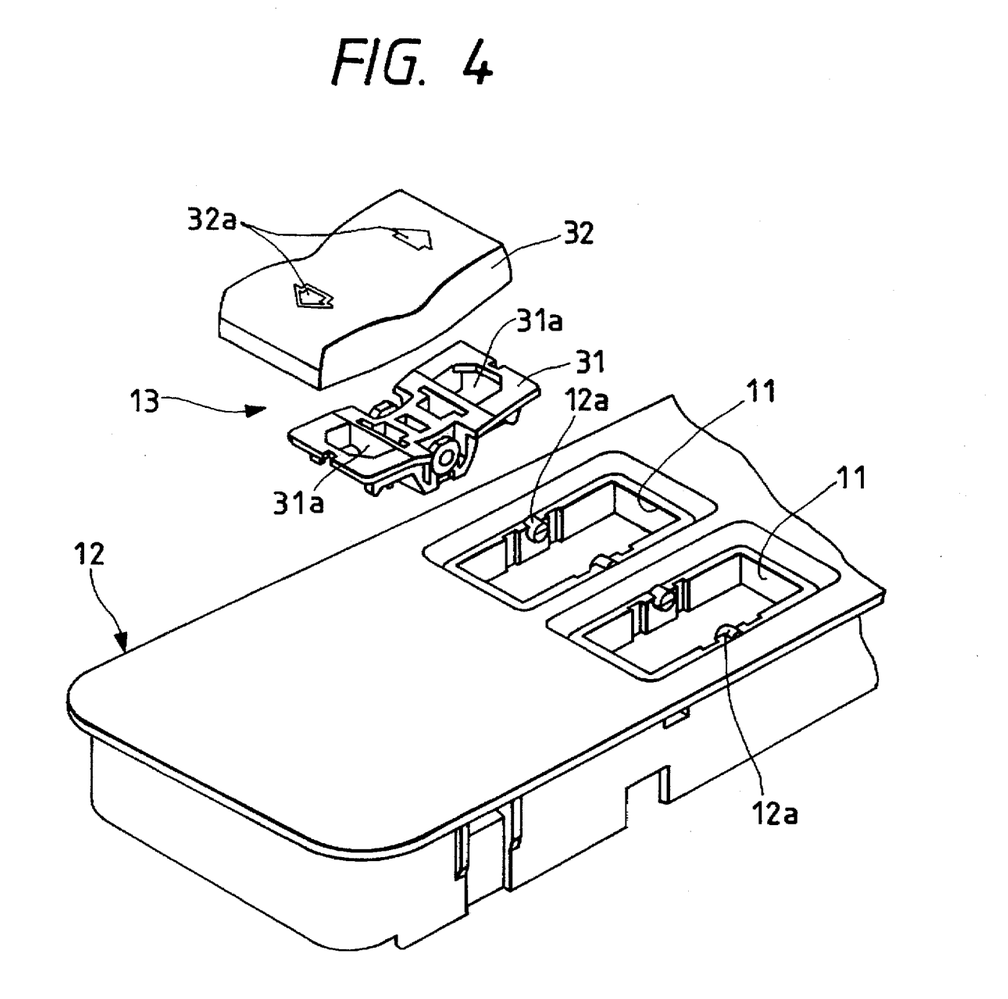
FIG. 4 is an exploded perspective view showing part of the two-stage movement seesaw switch apparatus provided in the power window unit of FIG. 3.

Referring particularly to FIG. 4, the manually operable knob 13 includes a holder 31 supported for pivotal motion around the support shafts 12a of the casing 12, and a key top 32 snap-fitted with the holder 31 and having a pair of light irradiation portions 32a at central portions on the opposite sides of a surface thereof. The other manually operable knob 14 is constructed in a similar manner. The holder 31 has a pair of openings 31a formed therein for allowing light from the light emitting elements to pass therethrough to the light irradiation portions 32a of the key top 32. Further, another pair of manually operable knobs 33 and 34 are provided in the perforations 11a and 11b of the casing 12, respectively, as shown in FIG. 3.

Figure 1:
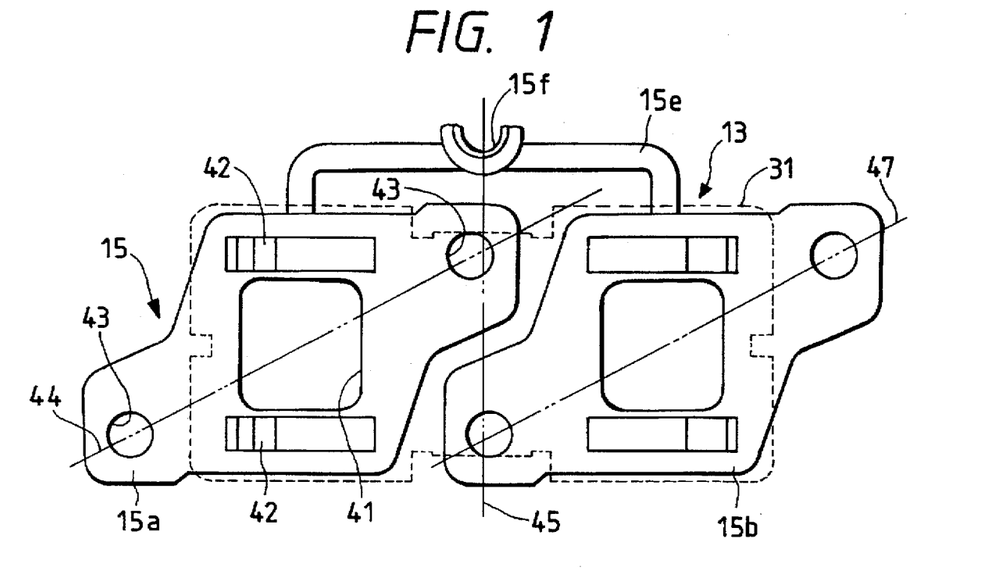
FIG. 1 is a plan view of part of a two-stage movement seesaw switch apparatus showing a preferred embodiment of the present invention.
Figure 2:
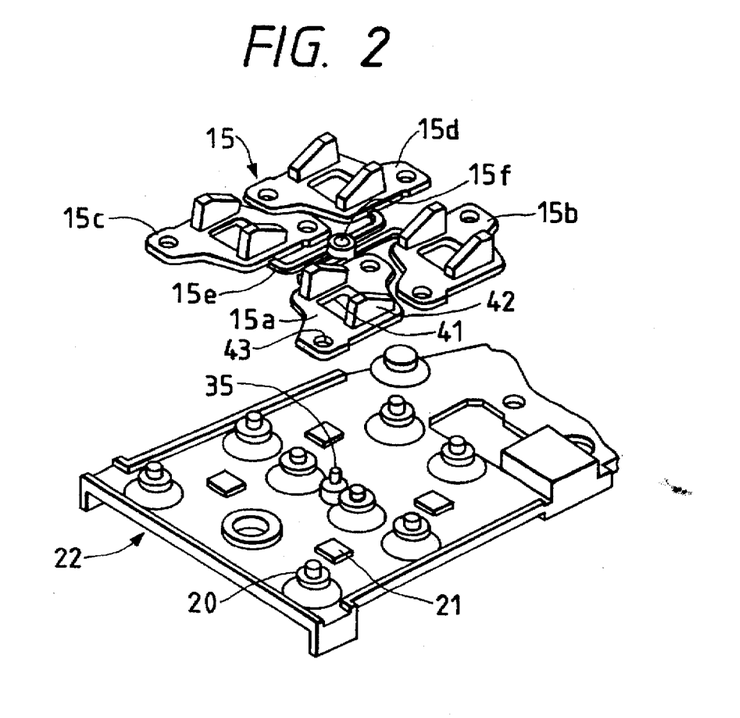
FIG. 2 is an exploded perspective view of a manually operable member and a click rubber member provided in the two-stage movement seesaw switch apparatus of FIG. 1.

As shown in FIGS. 1 and 2, the operation plates 15a to 15d are molded as a unitary member from a resin material and are connected to each other by way of resilient connection arms 15e, and an operation plates 15 is formed from the operation plates 15a to 15d and the connection arms 15e. A hole 15f is formed at the center of the connection arms 15e, and a projection 35 of the click rubber member 22 is fitted in the hole 15f to support the operation member 15 on the click rubber member 22.

Figure 5A:
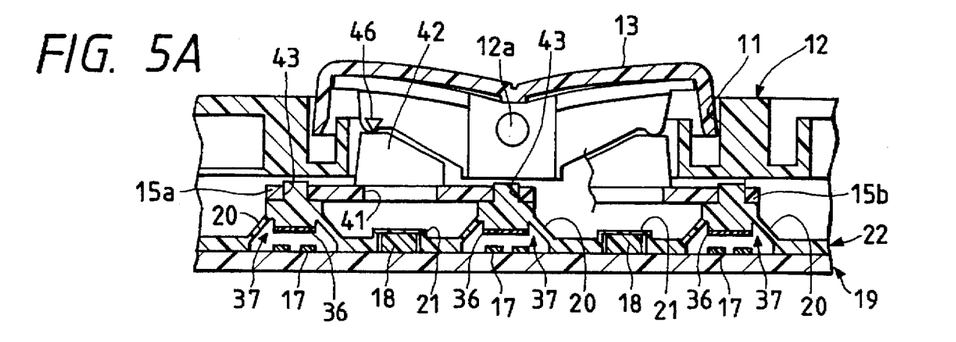
FIGS. 5A to 5C are schematic sectional views illustrating movement of the two-stage movement seesaw switch apparatus of FIG. 1.
Figure 5B:
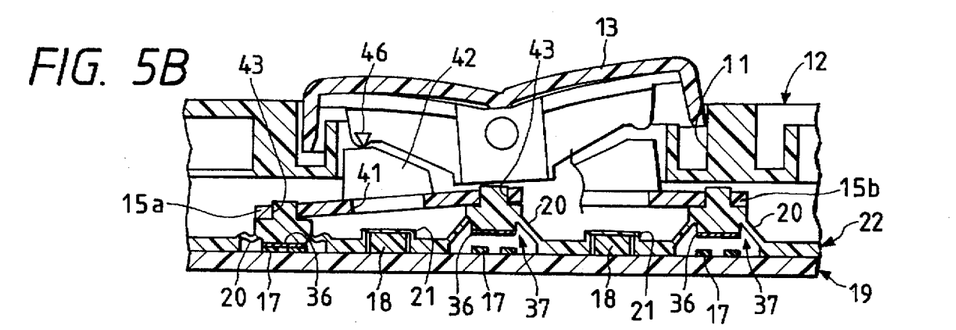
Figure 5C:
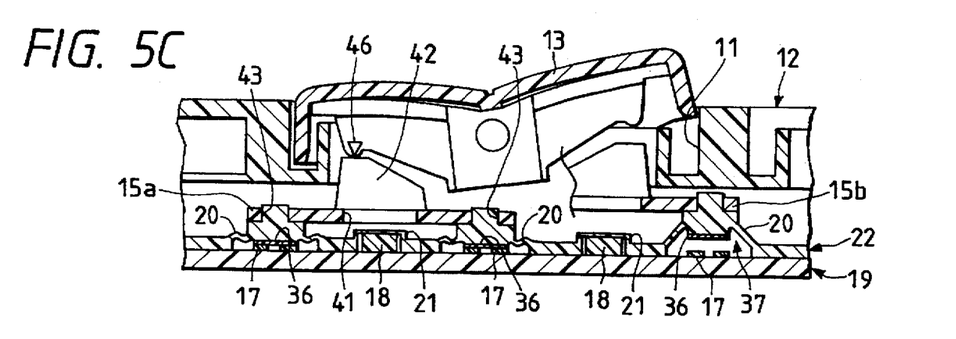

Referring now to FIGS. 5A to 5C, a movable contact 36 made of a conductive rubber material is provided in each of the hollow projections 20 of the click rubber member 22 in an opposing relationship to a corresponding one of the fixed contacts 17, and a push switch 37 is formed from the fixed contact 17 and the movable contact 36. Two of such push switched 37 are provided for each of the operation plates 15a to 15d.

Referring now to FIG. 1, an opening 41 for passing light emitted from a corresponding one of the LEDs 18 therethrough is formed at a central portion of the first operation plate 15a, and a pair of projections 42 are formed on opposite sides of the opening 41 on the first operation plate 15a (above and below the opening 41, as viewed in FIG. 1). The projections 42 serve as actuating portions for contacting with the bottom side of the manually operable knob 13. A pair of engaging holes 43 in which upper ends of outer faces of the hollow projections 20 are inserted are formed at opposite end portions of the first operation plate 15a, and each of the upper ends of the outer faces of the hollow projections 20 includes a horizontal face and a post-like portion extending from a central portion of the horizontal face such that the first operation plate 15a may be placed stably on the hollow projections 20. Since an imaginary line (or vertical plane) 44 interconnecting the pair of engaging holes 43 extends obliquely with respect to a center axis (or vertical plane defined by the axis) 45 of pivotal motion of the manually operable knob 13 (that is, an axial line of the support shafts 12a) and the pair of push switches 37 are positioned below the pair of engaging holes 43, a straight line (or vertical plane) interconnecting the push switches 37 (that is, the imaginary line/vertical plane 44) and the center axis (vertical plane) 45 of pivotal motion of the manually operable knob 13 intersect obliquely with each other. The distances between the projections 42 of the first operation plate 15a and the push switches 37 are set different from each other, and the difference in distance depends upon how to set the timings of first- and second-stage operation timings. Also the second operation plate 15b is formed similarly, and a straight line (or vertical plane) 47 interconnecting the pair of push switches 37 on the second operation plate 15b side and the straight line (or vertical plane) 44 interconnecting the pair of push switches 37 on the first operation plate 15a side extend parallel to each other. It is to be noted that the third operation plate 15c and the fourth operation plate 15d have the same basic constructions except they are formed symmetrically with the first and second operation plates 15a and 15b with respect to a line, respectively, and accordingly, description of the third and fourth operation plates 15c and 15d is omitted herein to avoid redundancy.

Operation of the two-stage movement seesaw switch apparatus of the present embodiment will be described below.

In the present two-stage movement seesaw switch apparatus, if an operator depresses, when the two-stage movement seesaw switch apparatus is in the non-operated condition shown in FIG. 5A, one side, for example, the left side in FIG. 5A, of the manually operable knob 13, then since the manually operable knob 13 is supported for rocking motion around the support shafts 12a of the casing 12, the manually operable knob 13 is tilted in the counter-clockwise direction in FIG. 5A around the center axis 45 of the support shafts 12a so that the depressed side (left side) of the manually operable knob 13 is moved down. The operating force applied to the manually operable knob 13 is transmitted from the rear face of the manually operable knob 13 to the first operation plate 15a by way of the corresponding projections 42 of the first operation plate 15a and further to the corresponding left and right hollow projections 20 of the click rubber member 22. In this instance, since the distances from the projections 42 to the left side hollow projection 20 are smaller than the distances from the projections 42 to the right side hollow projection 20, the force acting upon the left side hollow projection 20 is superior due to the difference in moment force, and as a result, the left side hollow projection 20 begins to be yieldably deformed. Then, at the point of time when the manually operable knob 13 is tilted, for example, by 5 degrees to the left side as seen in FIG. 5B, the left side hollow projection 20 is yieldably deformed by the pressing operation of the manually operable knob 13, thereby providing a click feeling. Further, the movable contact 36 provided on the hollow projection 20 is brought into contact with the fixed contact 17 opposing thereto so that the fixed contact 17 becomes conducting (on) by way of the movable contact 36. Consequently, a first-stage electric signal is outputted from the push switch 37 in accordance with the tilting operation of the manually operable knob 13.

If the manually operable knob 13 is further pushed downward from the condition of FIG. 5B, then since the deformation of the left side of the hollow projection 20 has completed, the first operation plate 15a is pivoted in the direction opposite to the former tilting direction around the left side hollow projection 20, whereupon a sufficient force acts upon the right side hollow projection 20. Then, at the point of time when the manually operable knob 13 is tilted, for example, to about 8 degrees to the left side as seen in FIG. 5C, the right side hollow projection 20 is yieldably deformed, thereby providing a click feeling. Further, the movable contact 36 provided in the hollow projection 20 is brought into contact with the fixed contact 17 opposing thereto so that the fixed contact 17 becomes conducting (on) by way of the movable contact 36. Consequently, a second-stage electric signal is outputted from the push switch 37 in accordance with the tilting operation of the manually operable knob 13. Since, during the movements described above, reactive forces exerted from the resilient forces of the left and right hollow projections 20 are transmitted to the manually operable knob 13 by way of the operating point between the first operation plate 15a positioned on the center line of the manually operable knob 13 in the longitudinal direction and the manually operable knob 13, the operator can obtain a comparatively uniform operation feeling. It is to be noted that, if the manually operable knob 13 in such a tilted condition as described above is released, then the depressed side of the manually operable knob 13 is pushed up by the resilient forces of the pair of hollow projections 20 by way of the first operation plate 15a so that the manually operable knob 13 returns to its non-operated condition shown in FIG. 5A. Simultaneously, the movable contacts 36 in the contacting condition are spaced away from the individual fixed contacts 17 to return the set of two push switches 37 to the non-conducting (off) conditions.

On the other hand, if the operator depresses, in the non-operated condition shown in FIG. 5A, the other side, for example, the right side in FIG. 5A, of the manually operable knob 13, then the manually operable knob 13 is pivoted in the clockwise direction in FIG. 5A to press the second operation plate 15b, and consequently, similarly as when the first operation plate 15a is pressed, first- and second-stage electric signals are output from the set of two push switches 37 corresponding to the second operation plate 15b in response to the tilting angle of the manually operable knob 13.

In this manner, in the embodiment described above, since the straight line (or vertical plane) interconnecting push switches 37 in each set and the center axis (or vertical plane defined by the center axis) 45 of pivotal motion of the manually operable knob 13 intersect obliquely with each other, while the distances required for the push switches 37 in each set are secured, the dimension of the arrangement of the two operation plates 15a and 15b in the longitudinal direction of the manually operable knob 13 can be made comparatively short. Further, since the pair of operation plates 15a and 15b can be disposed just below the longitudinal direction passing the center of the manually operable knob 13, when the manually operable knob 13 is manually depressed, the pressing force from the manually operable knob 13 is transmitted uniformly to the operation plates 15a and 15b. Furthermore, since the two push switches 37 are disposed on the opposite sides of the center line of the longitudinal direction of the manually operable knob 13, the reactive force acting upon the manually operable knob 13 is uniform, and as a result, a good operation feeling is obtained.

Further, since the click rubber member 22 includes the reduced thickness projections 21 for accommodating the LEDs 18 therein but does not have an opening or openings formed therein for allowing the LEDs 18 to project therethrough, a substantially overall area of the base plate 19 is covered with the click rubber member 22, and consequently, the waterproofing of the base plate 19 can be improved. Furthermore, since the four operation plates 15a to 15d corresponding to the two sets of seesaw switch apparatus are connected to each other by way of the connection arms 15e and they are molded as a unitary member of the single operation member 15, assembly is greatly simplified when compared with an alternative case wherein the operation plates 15a to 15d are assembled individually to the click rubber member 22. Further, since the manually operable knob 13 is formed from the holder 31 and the key top 32 snap-fitted with the holder 31, the manually operable knob 13 can have various configurations by replacing only the key top 32.

Further, since each of the operation plates 15a to 15d has, at a central portion thereof, the opening 41 and the pair of projections 42 which are opposed to each other across the opening 41, light emitted from the corresponding LED 18 can pass through the opening 41 and be irradiated upon the light irradiation portions 32a of the key top 32. Accordingly, a two-stage movement seesaw switch apparatus of the light irradiation type which is compact and superior in operation feeling can be obtained.

It is to be noted that, while the two-stage movement seesaw switch apparatus of the embodiment described above is of the light irradiation type, the present invention is not limited to the specific two-stage movement seesaw switch apparatus and can be applied to a two-stage movement seesaw switch apparatus of the non-light irradiation type. In this instance, since not only the LEDs 18 but also the openings 41 in the operation plates 15a to 15d need not be provided, the projections 42 may be extended to the locations of the opening 41 until they are formed into a single unitary member.

Further, while the two-stage movement seesaw switch arrangement in the embodiment described above includes the two manually operable knobs 13 and 14, the two pairs of operation plates 15a to 15d and the eight push switches 37, similar effects can be exhibited also where a two-stage movement seesaw switch apparatus includes arbitrary n manually operable knobs, n pairs of operation plates and 4n push switches, and it may include, for example, a single manually operable knob, one pair of operation plates and four push switches.

Having now fully described the invention, it will be apparent to one of ordinary skill in the art that many changes and modifications can be made thereto without departing from the spirit and scope of the invention as set forth herein.

What is claimed is:

1. A two-stage movement seesaw switch apparatus, comprising:

a housing;

a knob pivotably connected to the housing such that the knob pivots about an axis;

first and second push switches disposed on the housing; and an operation plate positioned between the knob and the first and second push switches such that manual depression of the knob in a first direction around the axis causes the operation plate to pivot about the second push switch and to actuate the first push switch, and further depression of the knob in the first direction causes the operation plate to pivot about the actuated first push switch and to actuate the second push switch;

wherein an imaginary straight line between the first and second push switches intersects a vertical plane defined by the axis at an oblique angle.

2. The two-stage movement seesaw switch apparatus according to claim 1, further comprising a light source positioned under the operation plate, wherein the operation plate defines a central opening through which light from the light source is irradiated upon a lower surface of the knob.

3. The two-stage movement seesaw switch apparatus according to claim 1, further comprising:

third and fourth push switches disposed on the housing; and a second operation plate positioned between the knob and the third and fourth push switches such that manual depression of the knob in a second direction around the axis causes the second operation plate to pivot about the fourth push switch and to actuate the third push switch, and further depression of the knob in the second direction causes the second operation plate to pivot about the actuated third push switch and to actuate the fourth push switch;

wherein a second imaginary straight line between the third and fourth push switches intersects the vertical plane defined by the axis at an oblique angle; and wherein the first imaginary straight line between the first and second push switches is parallel to the second imaginary straight line.

4. The two-stage movement seesaw switch apparatus according to claim 3, wherein the first operation plate and the second operation plate are connected by a resilient connection arm.

5. The two-stage movement seesaw switch apparatus according to claim 1, wherein the first push switch comprises a fixed contact, a resilient rubber member positioned over the fixed contact, and a movable contact disposed on an inner surface of the resilient rubber member, and wherein when the operation member is pivoted to actuate the first push switch, the operation member deforms the resilient rubber member such that the movable contact abuts the fixed contact, thereby causing the switch apparatus to produce an electrical signal.

6. The two-stage movement seesaw switch apparatus according to claim 5, wherein the second push switch includes a second resilient rubber member, and the first resilient rubber member of the first push switch is connected to the second resilient rubber member by a rubber sheet.

7. The two-stage movement seesaw switch apparatus according to claim 5, further comprising a projection extending from an upper surface of the resilient rubber member, the projection being received in an opening formed in the operation plate.

8. A two-stage movement seesaw switch apparatus, comprising:

a housing;

a knob pivotably connected to the housing about an axis;

first and second push switches disposed on the housing, each of said first and second push switches including a resilient rubber member; and an operation plate contacting the resilient rubber member of the first push switch at a first location, and contacting the resilient rubber member of the second push switch at a second location, the operation plate being contacted by the knob such that manual depression of the knob in a first direction around the axis causes the operation plate to pivot about the second push switch and to deform the resilient rubber member of the first push switch, and further depression of the knob in the first direction causes the operation plate to pivot about the deformed resilient rubber member of the first push switch and to deform the resilient rubber member of the second push switch;

wherein a vertical plane extending through the first and second locations intersects the axis of the knob at an oblique angle.

9. The two-stage movement seesaw switch apparatus according to claim 8, further comprising a light source positioned under the operation plate, wherein the operation plate defines a central opening through which light from the light source is irradiated upon a lower surface of the knob.

10. The two-stage movement seesaw switch apparatus according to claim 8, further comprising:

third and fourth push switches disposed on the housing, each of said third and fourth push switches including a resilient rubber member; and a second operation plate mounted on the resilient rubber member of the third push switch at a third location, and mounted on the resilient rubber member of the fourth push switch at a fourth location, the operation plate being contacted by the knob such that manual depression of the knob in a second direction around the axis causes the second operation plate to pivot about the fourth push switch and to deform the resilient rubber member of the third push switch, and further depression of the knob in the second direction causes the operation plate to pivot about the deformed resilient rubber member of the third push switch and to deform the resilient rubber member of the fourth push switch;

wherein a second imaginary straight line between the third and fourth locations is parallel to the first imaginary straight line.

11. The two-stage movement seesaw switch apparatus according to claim 10, wherein the first operation plate and the second operation plate are connected by a resilient connection arm.

12. The two-stage movement seesaw switch apparatus according to claim 8, wherein the first push switch comprises a fixed contact, said resilient rubber member which is positioned over the fixed contact, and a movable contact disposed on an inner surface of said resilient rubber member, and wherein when the operation member is pivoted to actuate the first push switch, the operation member deforms the resilient rubber member such that the movable contact abuts the fixed contact, thereby causing the switch apparatus to produce an electrical signal.

13. The two-stage movement seesaw switch apparatus according to claim 8, wherein the resilient rubber member of the first push switch is connected to the resilient rubber member of the second push switch by a rubber sheet.

14. The two-stage movement seesaw switch apparatus according to claim 8, wherein each resilient rubber member of the first and second push switches includes a projection which is received in an opening formed in the operation plate.

* * * * *